United States Patent
Wang et al.

(10) Patent No.: US 12,123,275 B1
(45) Date of Patent: Oct. 22, 2024

(54) MULTIFUNCTIONAL ROTATING CONTROL DEVICE

(71) Applicant: Unifusion Intelligent Technology Co. Ltd, Chengdu (CN)

(72) Inventors: Chunlei Wang, Chengdu (CN); Qiang Zhao, Chengdu (CN); Bo Kang, Chengdu (CN); Wei Zhang, Chengdu (CN); Qijun Zeng, Chengdu (CN)

(73) Assignee: Unifusion Intelligent Technology Co. Ltd, Chengdu (CN)

( * ) Notice: Subject to any disclaimer, the term of this patent is extended or adjusted under 35 U.S.C. 154(b) by 0 days.

(21) Appl. No.: 18/635,028

(22) Filed: Apr. 15, 2024

(51) Int. Cl.
    *E21B 33/08*     (2006.01)
    *E21B 21/08*     (2006.01)

(52) U.S. Cl.
    CPC ............ *E21B 33/085* (2013.01); *E21B 21/08* (2013.01)

(58) Field of Classification Search
    CPC ............................... E21B 33/085; E21B 21/08
    See application file for complete search history.

(56) References Cited

U.S. PATENT DOCUMENTS

| | | | | |
|---|---|---|---|---|
| 10,851,608 | B1* | 12/2020 | Pruitt | E21B 33/0415 |
| 10,961,795 | B1* | 3/2021 | Parker | E21B 21/08 |
| 2020/0040689 | A1* | 2/2020 | Yousef | E21B 4/003 |
| 2020/0362659 | A1* | 11/2020 | Fraczek | E21B 33/068 |
| 2021/0172272 | A1* | 6/2021 | Rakhunde | E21B 34/066 |
| 2021/0230966 | A1* | 7/2021 | Dietrich | F16K 5/0207 |
| 2021/0340834 | A1* | 11/2021 | Tran | E21B 33/085 |
| 2022/0003072 | A1* | 1/2022 | Northam | E21B 34/025 |
| 2022/0065066 | A1* | 3/2022 | Arteaga | E21B 33/063 |
| 2022/0403709 | A1* | 12/2022 | Clark | E21B 21/08 |
| 2023/0110604 | A1* | 4/2023 | Michaud | E21B 33/038 166/65.1 |

* cited by examiner

*Primary Examiner* — Taras P Bemko

(74) *Attorney, Agent, or Firm* — Bayramoglu Law Offices LLC

(57) ABSTRACT

A multifunctional rotating control device (RCD) includes an RCD assembly, a multi-way cross, and choke control modules. The RCD assembly includes a body and a rotating sealing assembly, where a bore through hole, two side outlets, and a straight-through outlet are formed in the body. The rotating sealing assembly is provided in the bore through hole, a straight-through cut-off valve is provided at the straight-through outlet, and there are two choke control modules. The two choke control modules are respectively connected to the two side outlets and the multi-way cross, and a side choke extends upward in a direction of the bore through hole. The two choke control modules are integrated onto the RCD assembly, and extend upward in the direction of the bore through hole.

20 Claims, 19 Drawing Sheets

MULTIFUNCTIONAL ROTATING CONTROL DEVICE

TECHNICAL FIELD

The present disclosure relates to the technical field of pressure control in drilling and completion, and in particular to a multifunctional rotating control device (RCD).

BACKGROUND

Fine pressure control can effectively prevent and control complex accidents in drilling and completion of petroleum, greatly reduce non-productive time, and shorten a drilling period. Key devices including an RCD, a control manifold and a metering device are usually used. According to prior art, the RCD is provided at a wellhead, while the control manifold and the metering device are provided on the ground far away from the wellhead. All key devices are functionally independent of each other, and are connected through a long high pressure line to form processes and systems. Consequently, the system has a low integration level, a complex site layout, a long installation and debugging period, a high cost, and hard maintenance.

SUMMARY

The present disclosure provides a multifunctional RCD, to solve one of the existing technical problems.

The present disclosure uses the following technical solutions:

A multifunctional RCD includes an RCD assembly, a multi-way cross, and choke control modules, where the RCD assembly includes a body and a rotating sealing assembly; a bore through hole, two side outlets, and a straight-through outlet are formed in the body; the rotating sealing assembly is provided in the bore through hole; and a straight-through cut-off valve is provided at the straight-through outlet; and there are two choke control modules; and the two choke control modules are respectively connected to the two side outlets and the multi-way cross, and extend upward in a direction of the bore through hole.

The present disclosure has the following working principle and the following beneficial effects: The choke control modules are respectively connected to the two side outlets and the multi-way cross, and extend upward in the direction of the bore through hole. That is, the two choke control modules are integrated onto the RCD assembly, and extend upward in the direction of the bore through hole. The choke modules each have a small occupied space in a horizontal direction of the RCD assembly, and a main occupied space extending upward in the direction of the bore through hole. Therefore, the whole RCD has a small occupied space and a compact structure. By providing the two symmetric choke control modules, in case of a fault of one choke control module, the other choke control module can be used to ensure continuous drilling. Meanwhile, in case of an insufficient flow capacity of the single choke control module, two choke control modules can work at the same time to ensure normal work.

The present disclosure may further make the following improvement based on the above technical solution.

Further, the multi-way cross includes a first outlet, a second outlet, and a third outlet; the first outlet communicates with the straight-through outlet; the straight-through cut-off valve is provided adjacent to the first outlet; and the two side outlets are respectively a first side outlet and a second side outlet;

the two choke control modules include a first choke control module and a second choke control module; and the first choke control module includes a first side cut-off valve, a second side cut-off valve, and a first side choke; the first side outlet, the first side cut-off valve, the first side choke, the second side cut-off valve, and the second outlet are communicated in sequence; and the first side choke extends upward in the direction of the bore through hole.

The above further solution has the following beneficial effects: The first side cut-off valve, the first side choke, the second side cut-off valve, and the second outlet are communicated in sequence. The first side choke extends upward in the direction of the bore through hole. That is, in the first choke control module, the two cut-off valves are provided at a lower position, and the choke is provided at an upper position. All components are arranged reasonably, and complied with standard requirements.

The present disclosure may further make the following improvement based on the above technical solution.

Further, the second choke control module includes a third side cut-off valve, a fourth side cut-off valve, and a second side choke; the second side outlet, the third side cut-off valve, the second side choke, the fourth side cut-off valve, and the third outlet are communicated in sequence; and the second side choke extends upward in the direction of the bore through hole.

The above further solution has the following beneficial effects: Likewise, in the second choke control module, the two cut-off valves are provided at a lower position, and the choke is provided at an upper position. All components are arranged reasonably, and complied with standard requirements.

The present disclosure may further make the following improvement based on the above technical solution.

Further, the first side cut-off valve, the second side cut-off valve, and the first side choke each are provided with a right-angle flow channel.

The above further solution has the following beneficial effects: By providing the right-angle flow channel for the above components, a right-angle connector turns out to be unnecessary, and the whole first choke control module can extend upward in the direction of the bore through hole. This achieves a simple structure, with less components and a high reliability.

The present disclosure may further make the following improvement based on the above technical solution.

Further, the third side cut-off valve, the fourth side cut-off valve, and the second side choke each are provided with a right-angle flow channel.

The above further solution has the following beneficial effects: Likewise, by providing the right-angle flow channel for the above components, a right-angle connector turns out to be unnecessary, and the whole second choke control module can extend upward in the direction of the bore through hole. This achieves a simple structure, with less components and a high reliability.

The present disclosure may further make the following improvement based on the above technical solution.

Further, the first side cut-off valve and the second side cut-off valve are opposite to each other; and a choke double-output actuator is provided between the first side cut-off valve and the second side cut-off valve and configured to drive the first side cut-off valve and the second side cut-off valve to turn on or off at the same time.

The above further solution has the following beneficial effects: The first side cut-off valve and the second side cut-off valve are opposite to each other, namely control stems of two valve trims are opposite to each other. Thus, the actuator is provided conveniently, without occupying an outer space of the whole first choke control module. Meanwhile, the choke double-output actuator drives the first side cut-off valve and the second side cut-off valve to turn on or off at the same time, such that one actuator controls two cut-off valves. This reduces product components, and improves a control efficiency.

The present disclosure may further make the following improvement based on the above technical solution.

Further, the third side cut-off valve and the fourth side cut-off valve are opposite to each other; and a choke double-output actuator is provided between the third side cut-off valve and the fourth side cut-off valve and configured to drive the third side cut-off valve and the fourth side cut-off valve to turn on or off at the same time.

The above further solution has the following beneficial effects: Likewise, the third side cut-off valve and the fourth side cut-off valve are opposite to each other, namely control ends of two valve trims are opposite to each other. Thus, the actuator is provided conveniently, without occupying an outer space of the whole second choke control module. Meanwhile, the choke double-output actuator drives the third side cut-off valve and the fourth side cut-off valve to turn on or off at the same time, such that one actuator controls two cut-off valves. This reduces product components, and improves a control efficiency.

The present disclosure may further make the following improvement based on the above technical solution.

Further, a filter is provided in a flow channel at an outlet end of the first side cut-off valve.

The above further solution has the following beneficial effects: The filter in front of the choke can effectively prevent a large-grained solid phase from blocking the choke to cause pressure fluctuation.

The present disclosure may further make the following improvement based on the above technical solution.

Further, a filter is provided in a flow channel at an outlet end of the third side cut-off valve.

The above further solution has the following beneficial effects: The filter in front of the choke can effectively prevent a large-grained solid phase from blocking the choke to cause pressure fluctuation.

The present disclosure may further make the following improvement based on the above technical solution.

Further, the multifunctional RCD further includes a compression mechanism for compressing the rotating sealing assembly; and the compression mechanism is provided on the body.

The above further solution has the following beneficial effects: The rotating sealing assembly is compressed in the bore through hole of the body through the compression mechanism to ensure reliable compression.

The present disclosure may further make the following improvement based on the above technical solution.

Further, the compression mechanism includes a compression part and a driving mechanism; and the driving mechanism drives the compression part to extend out of an inner surface of the body or retract into the body.

The above further solution has the following beneficial effects: The driving mechanism drives the compression part to extend out of the inner surface of the body or retract into the body. That is, one driving mechanism drives a plurality of compression parts.

The present disclosure may further make the following improvement based on the above technical solution.

Further, the driving mechanism includes a single-output actuator and a transmission mechanism; the transmission mechanism includes a pinion, a swing gear, and cone gears; an output shaft of the single-output actuator is fixedly connected to the pinion; the swing gear is sleeved on an outer side of the body; an external gear in transmission connection with the pinion is provided at an outer side of the swing gear; a bevel gear in transmission connection with a plurality of the cone gears is provided on a top of the swing gear; and the cone gears each are in screwed driving connection with the compression part.

The above further solution has the following beneficial effects: Through the transmission mechanism including the pinion, the swing gear, and the cone gear, gear transmission from the output shaft of the actuator to the cone gear is realized to ensure the reliable transmission.

The present disclosure may further make the following improvement based on the above technical solution.

Further, a first bearing is fixedly provided on the body; and the first bearing includes an inner race fixedly connected to the body, and an outer race being the swing gear.

The above further solution has the following beneficial effects: The outer race of the first bearing serves as the swing gear. By skillfully providing the gear on the outer race, the whole transmission device has less components.

The present disclosure may further make the following improvement based on the above technical solution.

Further, one end of the compression part is provided with an outer thread; the cone gear is provided with an inner thread, and fixedly connected to the body through a second bearing; and the outer thread and the inner thread are engaged and are in screwed driving connection.

The above further solution has the following beneficial effects: With thread engagement and the second bearing, the compression part is driven to move in a radial direction of the body, with a high reliability.

The present disclosure may further make the following improvement based on the above technical solution.

Further, the other end of the compression part passes through the body and is slidably connected to the body.

The above further solution has the following beneficial effects: The compression part is slidably connected to the body to provide desirable supporting and guiding effects.

The present disclosure may further make the following improvement based on the above technical solution.

Further, a non-circular hole is formed in the body; and the compression part is provided with a structure matching with the non-circular hole and slidably connected to the structure.

The above further solution has the following beneficial effects: Through a guiding hole of a non-circular hole structure, rotation of the compression part in a circumferential direction of the guiding hole is prevented.

The present disclosure may further make the following improvement based on the above technical solution.

Further, there are a plurality of compression parts that are equally spaced in a circumferential direction of the body.

The above further solution has the following beneficial effects: The plurality of compression parts provide a larger compressing force. The plurality of compression parts are equally spaced, which facilitates equalization of a pressure, and makes compression more reliable.

The present disclosure may further make the following improvement based on the above technical solution.

Further, the multifunctional RCD further includes a flow detection module; the multi-way cross further includes a fourth outlet; and the flow detection module is provided at the fourth outlet end and communicated with the multi-way cross.

The above further solution has the following beneficial effects: The flow detection module is provided, namely the flow detection module is integrated onto the RCD, thereby realizing flow detection.

The present disclosure may further make the following improvement based on the above technical solution.

Further, the flow detection module includes a flowmeter, a first flow cut-off valve, and a second flow cut-off valve; the flowmeter extends upward in the direction of the bore through hole; the first flow cut-off valve and the second flow cut-off valve are respectively provided at two ends of the flowmeter, and communicate with the flowmeter; an inlet of the flowmeter is a flow detection input outlet; the flow detection input outlet is provided at the fourth outlet end; and an outlet of the second flow cut-off valve is a flow detection output outlet.

The above further solution has the following beneficial effects: The flowmeter extends upward in the direction of the bore through hole. That is, the whole flow detection module is integrated onto the RCD assembly, and extends upward in the direction of the bore through hole. The flow detection module has a small occupied space in a horizontal direction of the RCD assembly, and a main occupied space extending upward in the direction of the bore through hole. Therefore, the whole RCD has a small occupied space and a compact structure.

The present disclosure may further make the following improvement based on the above technical solution.

Further, the first flow cut-off valve and the second flow cut-off valve are opposite to each other; and a flow double-output actuator is provided between the first flow cut-off valve and the second flow cut-off valve and configured to drive one of the first flow cut-off valve and the second flow cut-off valve to turn on and the other of the first flow cut-off valve and the second flow cut-off valve to turn off.

The above further solution has the following beneficial effects: The flow double-output actuator drives one of the first flow cut-off valve and the second flow cut-off valve to turn on and the other of the first flow cut-off valve and the second flow cut-off valve to turn off, such that one actuator controls two cut-off valves. This reduces product components, and improves a control efficiency.

REFERENCE NUMERALS

Figure 1:
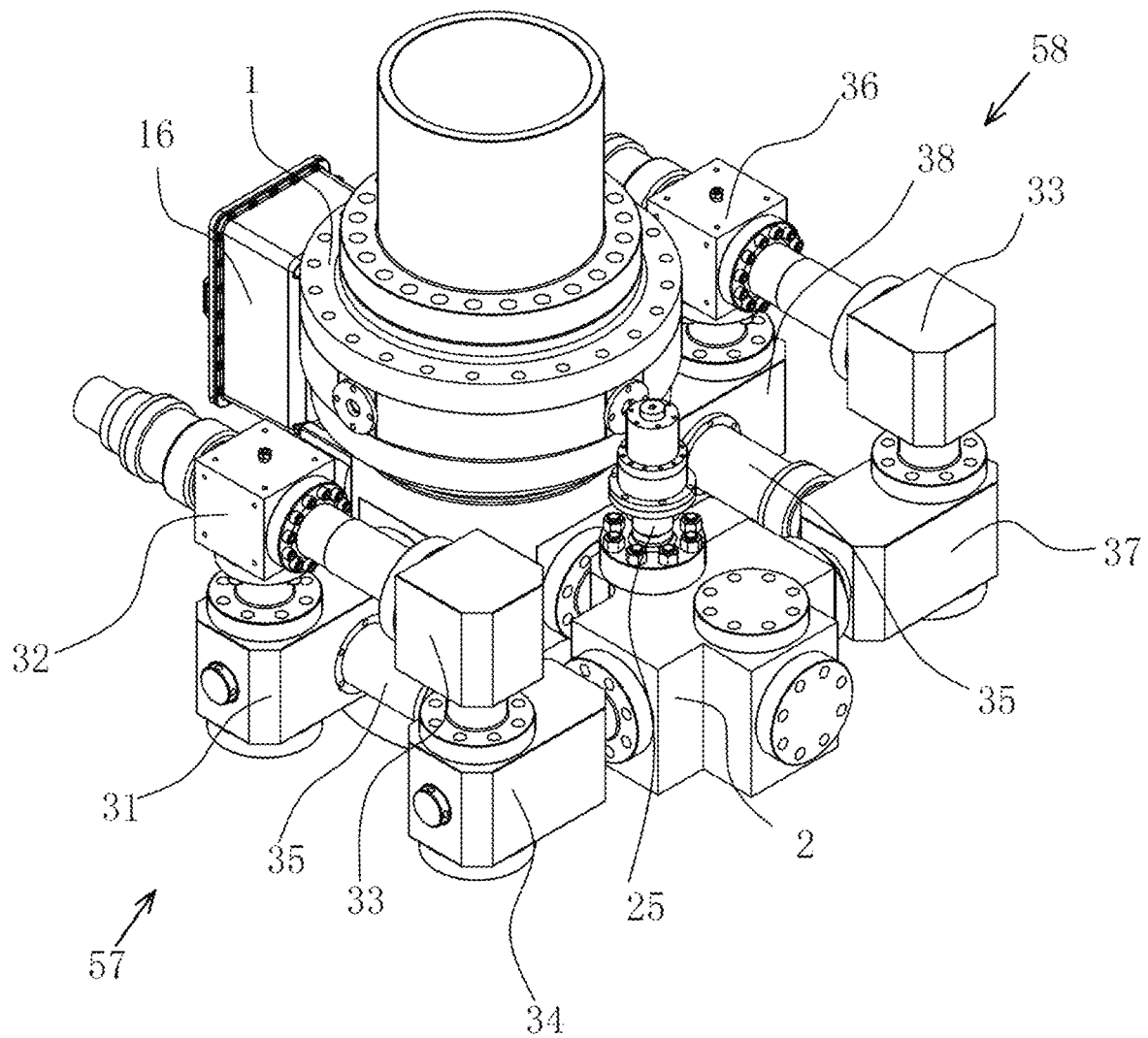
FIG. 1 is a stereoscopic structural schematic view of a multifunctional RCD according to Embodiment 1 of the present disclosure.

1: RCD assembly, 11: body, 12: rotating sealing assembly, 13: first side outlet, 14: second side outlet, 15: straight-through outlet, 16: control pod, 2: multi-way cross, 21: first outlet, 22: second outlet, 23: third outlet, 24: fourth outlet, 25: straight-through cut-off valve, 31: first side cut-off valve, 32: first side choke, 33: first right-angle connector, 34: second side cut-off valve, 35: choke double-output actuator, 36: second side choke, 37: fourth side cut-off valve, 38: third side cut-off valve, 39: filter, 4: compression mechanism, 41: single-output actuator, 42: pinion, 43: swing gear, 44: bevel gear, 45: cone gear, 46: compression part, 47: second bearing, 51: flowmeter, 52: first flow cut-off valve, 53: second flow cut-off valve, 54: flow double-output actuator, 55: second right-angle connector, 56: three-way connector; 57: first choke module; and 58: second choke module.

DETAILED DESCRIPTION OF THE EMBODIMENTS

The principles and features of the present disclosure are described below with reference to the accompanying drawings. The listed examples are only used to explain the present disclosure, rather than to limit the scope of the present disclosure.

FIG. 1 to FIG. 11 illustrate a structural schematic view of a multifunctional RCD according to Embodiment 1 of the present disclosure.

A multifunctional RCD includes RCD assembly 1, multi-way cross 2, and choke control modules. The RCD assembly 1 includes body 11 and rotating sealing assembly 12. A bore through hole, two side outlets and straight-through outlet 15 are formed in the body 11. The rotating sealing assembly 12 is provided in the bore through hole. Straight-through cut-off valve 25 is provided at the straight-through outlet 15. There are two choke control modules. The two choke control modules are respectively connected to the two side outlets and the multi-way cross 2, and extend upward in a direction of the bore through hole, namely in an upward direction in the figure.

In the embodiment, the multi-way cross 2 includes first outlet 21, second outlet 22, and third outlet 23. The first outlet 21 communicates with the straight-through outlet 15. The straight-through cut-off valve 25 is provided adjacent to a first outlet 21. The two side outlets are respectively first side outlet 13 and second side outlet 14. The choke control modules include a first choke control module 57 and a second choke control module 58. The first choke control module 57 includes first side cut-off valve 31, second side cut-off valve 34, and first side choke 32. The first side outlet 13, the first side cut-off valve 31, the first side choke 32, the second side cut-off valve 34, and the second outlet 22 are communicated in sequence. The first side choke 32 extends upward in the direction of the bore through hole.

The second choke control module 58 includes third side cut-off valve 38, fourth side cut-off valve 37, and second side choke 36. The second side outlet 14, the third side cut-off valve 38, the second side choke 36, the fourth side cut-off valve 37, and the third outlet 23 are communicated in sequence. The second side choke 36 extends upward in the direction of the bore through hole.

As shown in FIG. 1, control pod 16 for controlling the multifunctional RCD is provided at a side of the body 11 opposite to the multi-way cross 2. That is, a control module is provided in the control pod 16. The control module is electrically connected to the choke control module, the straight-through cut-off valve 25, and single-output actuator 41. In other words, the control module controls on-off of each valve in the choke control module, controls on-off of the straight-through cut-off valve 25, and controls the power output of the single-output actuator 41. The compression action of a compression mechanism on the RCD and the release action of the rotating sealing assembly are driven by the single-output actuator 41.

In the embodiment, as shown in the figure, the two choke control modules are respectively integrated onto two sides of the RCD assembly 1, and extend upward in the direction of the bore through hole. That is, the choke module has a small occupied space in a horizontal direction of the RCD assembly 1, and a main occupied space extending upward in the direction of the bore through hole. Therefore, the whole multifunctional RCD has a small occupied space and a compact structure.

Figure 3:
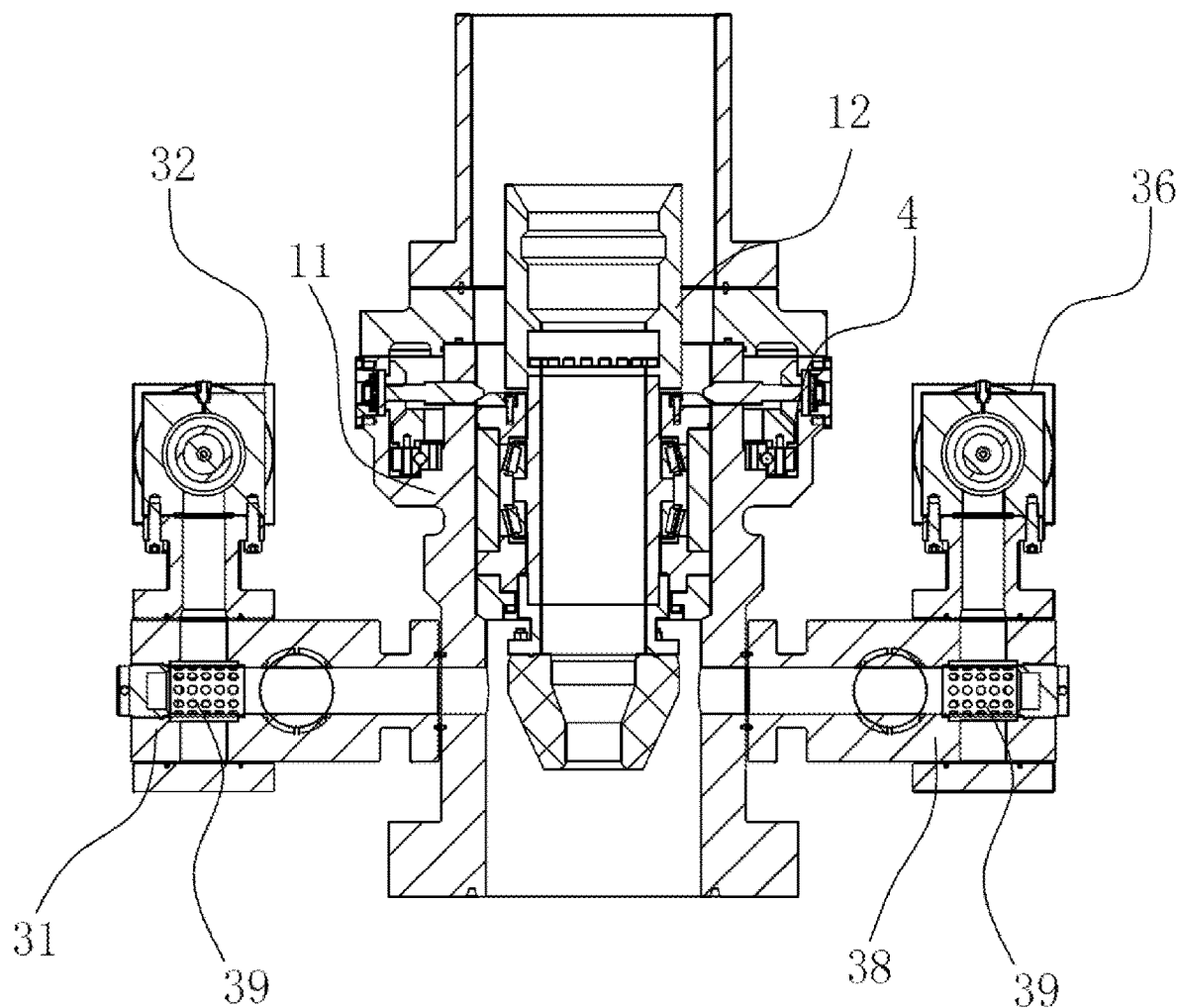
FIG. 3 is a sectional view in a second direction according to Embodiment 1.
Figure 5:
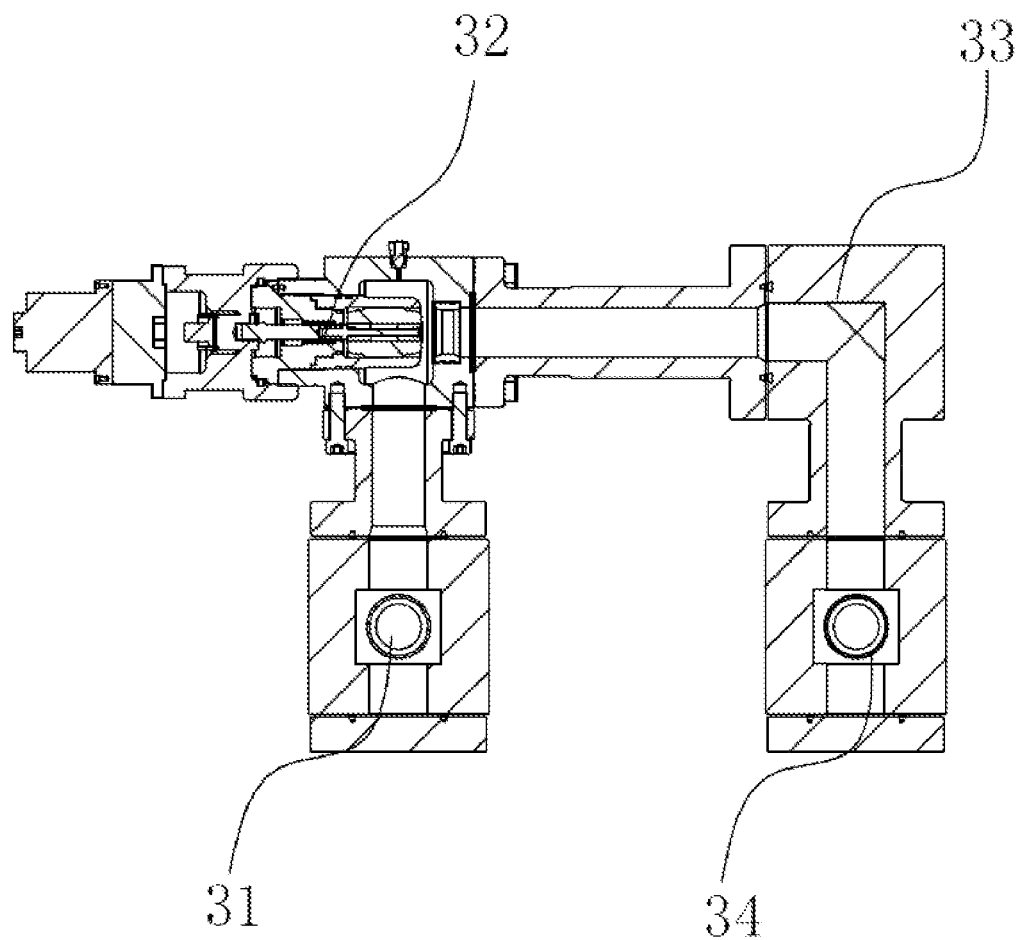
FIG. 5 is a partially sectional view of a choke module according to Embodiment 1.
Figure 6:
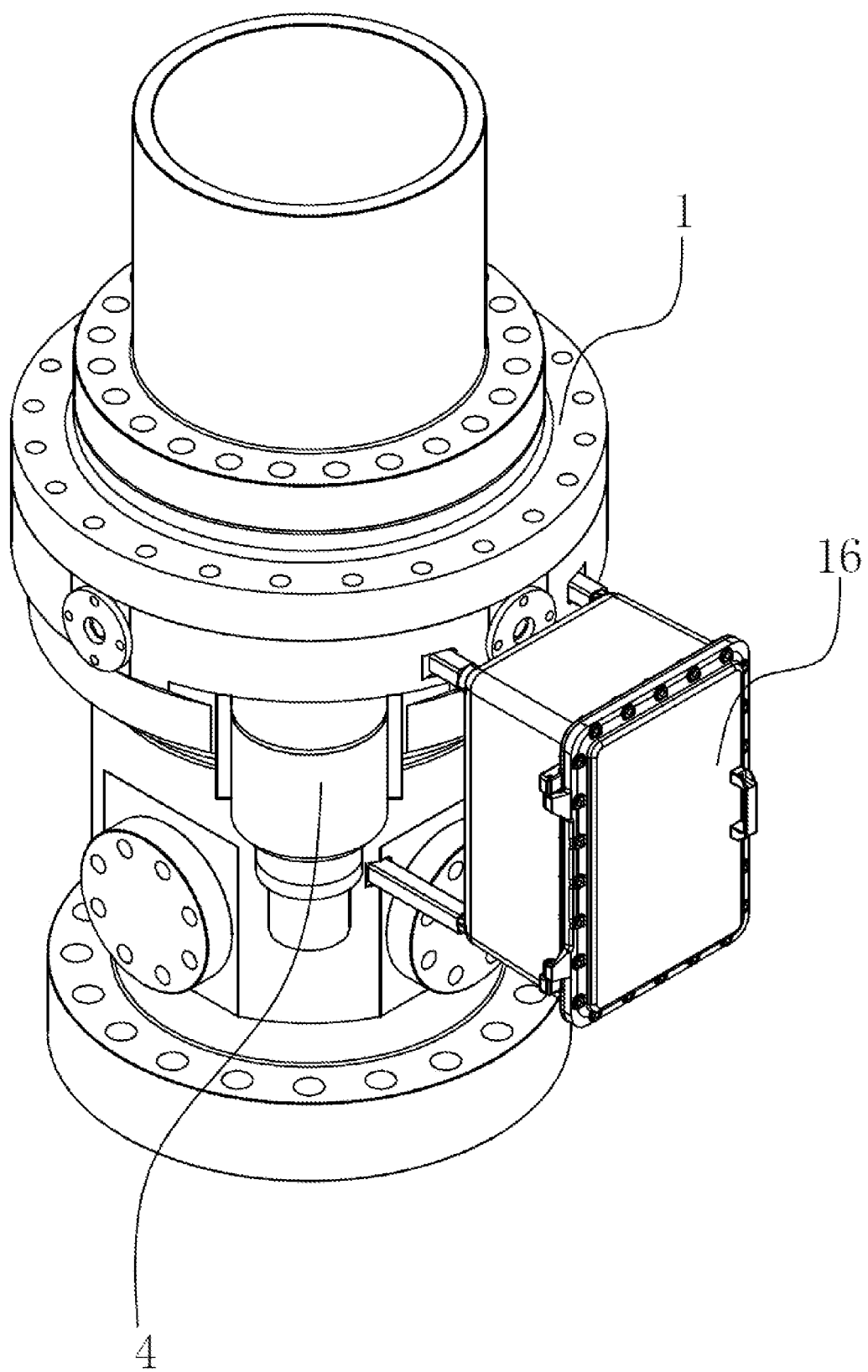
FIG. 6 is a stereoscopic structural schematic view of an RCD assembly according to Embodiment 1.
Figure 7:
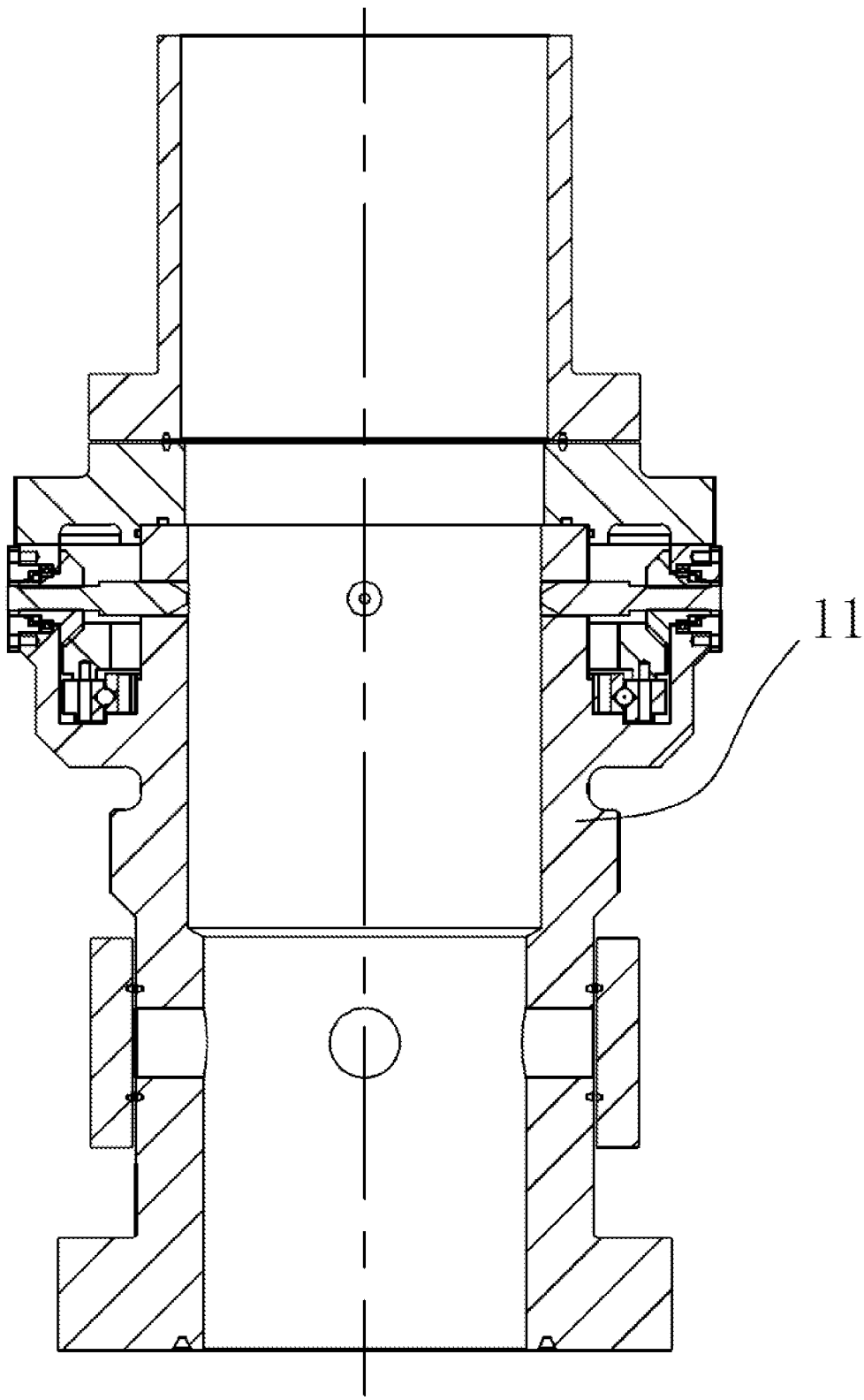
FIG. 7 is a sectional view of a body according to Embodiment 1.
Figure 8:
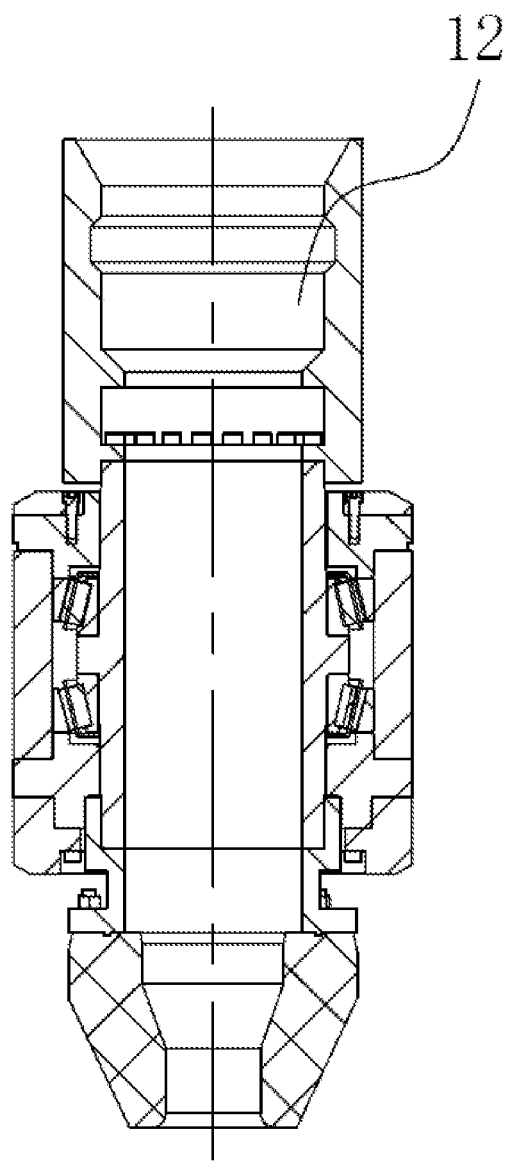
FIG. 8 is a sectional view of a rotating sealing assembly according to Embodiment 1.
Figure 9:
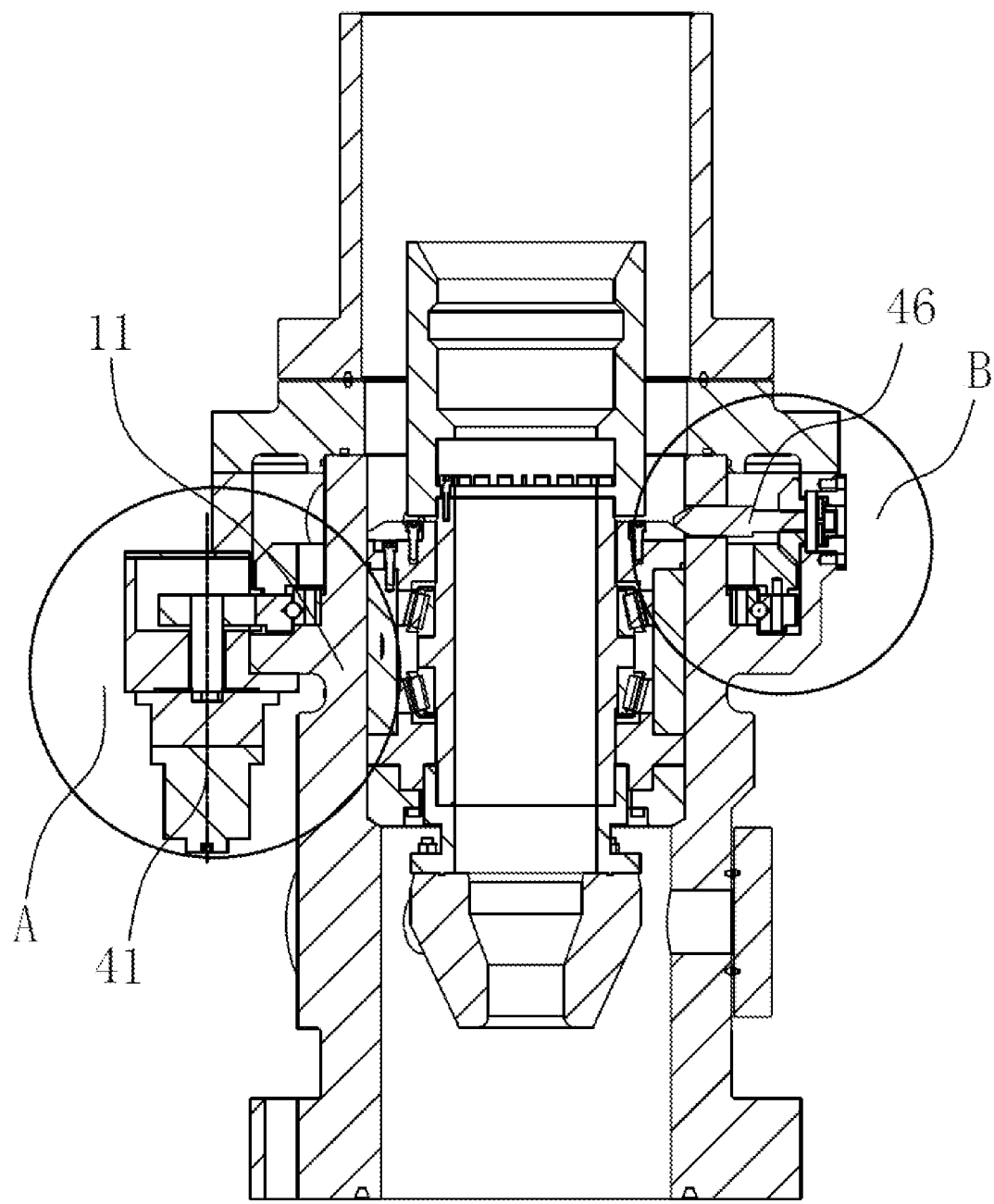
FIG. 9 is a sectional view of an RCD assembly according to Embodiment 1.

As shown in FIG. 3 and FIG. 5, the first side cut-off valve 31, the second side cut-off valve 34, and the first side choke 32 each are provided with a right-angle flow channel. The third side cut-off valve 38, the fourth side cut-off valve 37, and the second side choke 36 each are provided with a right-angle flow channel.

Specifically, for the first choke control module, the first side outlet 13 is connected to an input port of the first side cut-off valve 31. An output port of the first side cut-off valve 31 is connected to an input port of the first side choke 32. An output port of the first side choke 32 is connected to an output port of the second side cut-off valve 34 through first right-angle connector 33. An output port of the second side cut-off valve 34 is connected to the second outlet 22.

For the second choke control module, the second side outlet 14 is connected to an input port of the third side cut-off valve 38. An output port of the third side cut-off valve 38 is connected to an input port of the third side choke 36. An output port of the third side choke 36 is connected to an output port of the fourth side cut-off valve 37 through the first right-angle connector 33. An output port of the fourth side cut-off valve 37 is connected to the third outlet 23.

Figure 2:
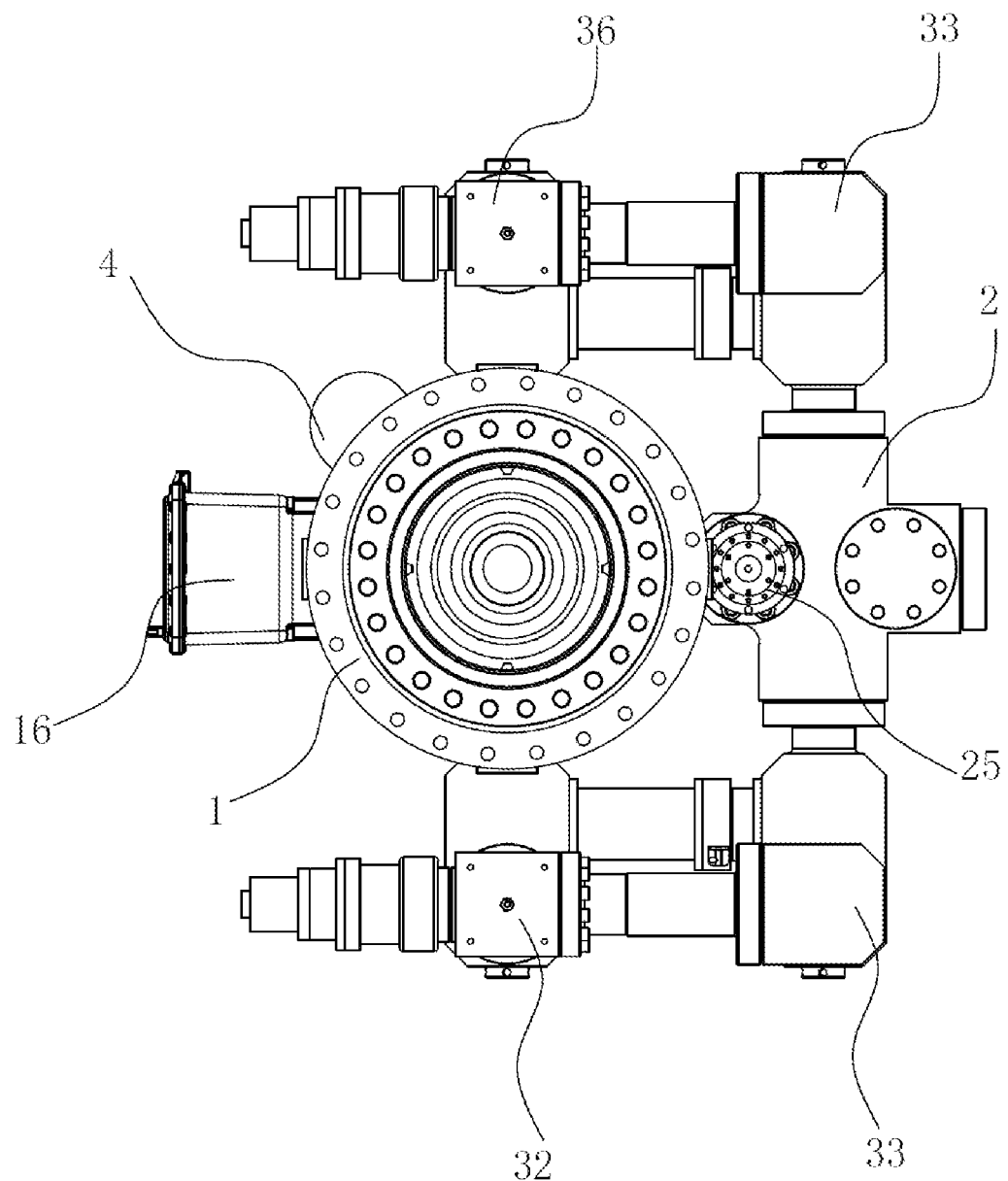
FIG. 2 is a top view in a first direction according to Embodiment 1.
Figure 4:
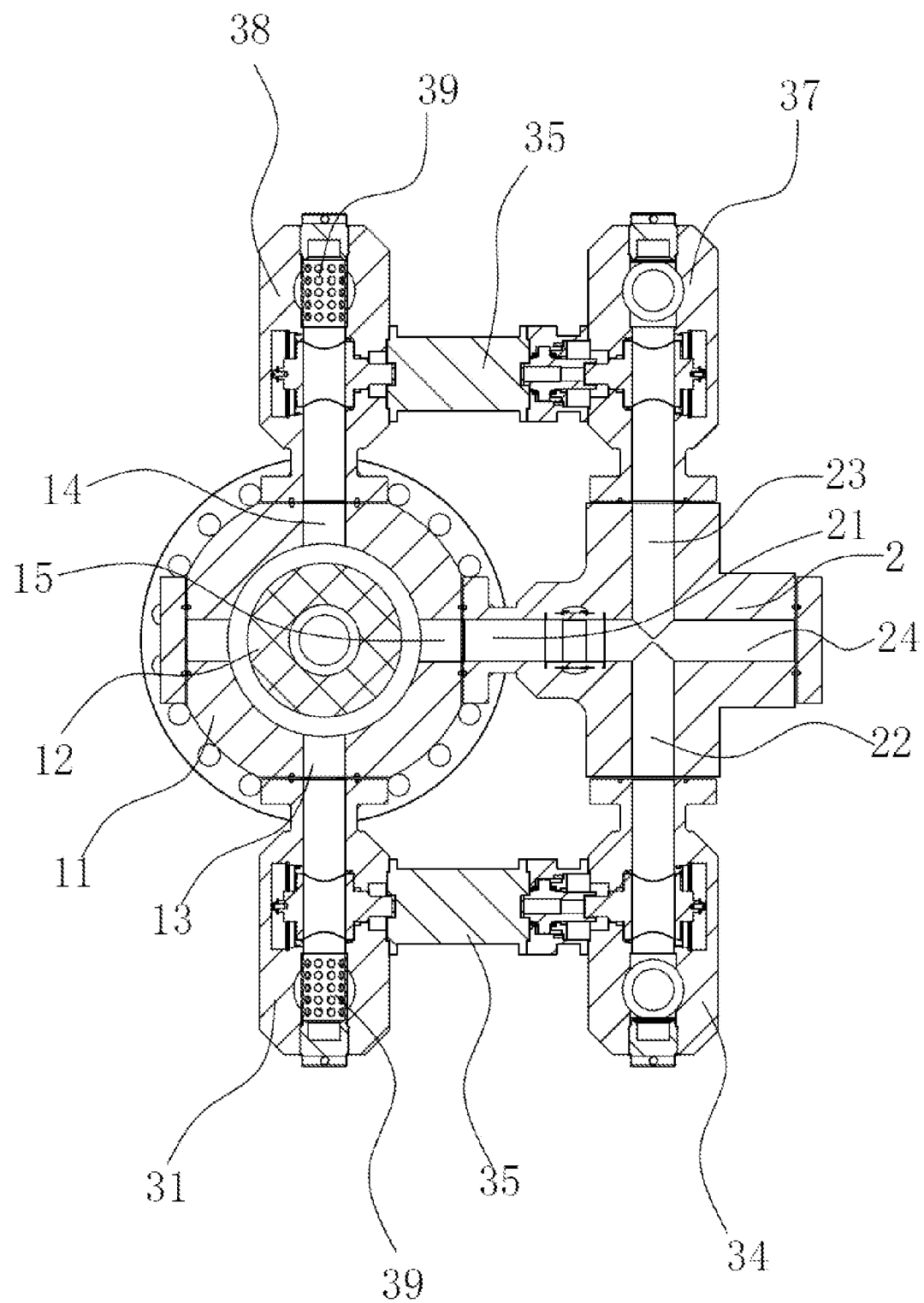
FIG. 4 is a sectional view in a third direction according to Embodiment 1.

As shown in FIG. 2 and FIG. 4, the first side cut-off valve 31 and the second side cut-off valve 34 are opposite to each other. Choke double-output actuator 35 is provided between the first side cut-off valve 31 and the second side cut-off valve 34 and configured to drive the first side cut-off valve 31 and the second side cut-off valve 34 to turn on or off at the same time. The third side cut-off valve 38 and the fourth side cut-off valve 37 are opposite to each other. Choke double-output actuator 35 is provided between the third side cut-off valve 38 and the fourth side cut-off valve 37 and configured to drive the third side cut-off valve 38 and the fourth side cut-off valve 37 to turn on or off at the same time.

Specifically, a valve trim of the first side cut-off valve 31 is provided adjacent to an input end of the first side cut-off valve. A valve trim of the second side cut-off valve 34 is provided adjacent to an output end of the second side cut-off valve. With two opposite valve trims, the choke double-output actuator 35 drives the first side cut-off valve 31 and the second side cut-off valve 34 to turn on or off at the same time. Likewise, a valve trim of the third side cut-off valve 38 is provided adjacent to an input end of the third side cut-off valve. A valve trim of the fourth side cut-off valve 37 is provided adjacent to an output end of the fourth side cut-off valve. With two opposite valve trims, the choke double-output actuator 35 drives the third side cut-off valve 38 and the fourth side cut-off valve 37 to turn on or off at the same time. The above structure makes one actuator control two cut-off valves. This reduces product components, and improves a control efficiency.

In the embodiment, the two double-output actuators are an electric driving structure. A manual driving mechanism may also be provided. In case of a failure or a fault of the electric driving structure, the manual driving mechanism can ensure normal work of the system.

As shown in FIG. 3, filter 39 is provided in a flow channel at an outlet end of the first side cut-off valve 31 and in a flow channel at an outlet end of the third side cut-off valve 38. The filter 39 in front of the choke can effectively prevent a large-grained solid phase from blocking the choke to cause pressure fluctuation.

In the embodiment, the two side chokes are an electric driving structure. Likewise, a manual driving mechanism may also be provided. In case of a failure or a fault of the electric driving structure, the manual driving mechanism can ensure normal work of the system.

As shown in FIG. 3, FIG. 7 to FIG. 11, the multifunctional RCD in the embodiment further includes compression mechanism 4 for compressing the rotating sealing assembly 12. The compression mechanism 4 is provided on the body 11. The compression mechanism 4 includes compression part 46 and a driving mechanism. The driving mechanism is configured to drive the compression part 46 to extend out of an inner surface of the body 11 or retract into the body 11.

The driving mechanism includes the single-output actuator 41 and a transmission mechanism. The transmission mechanism includes pinion 42, swing gear 43, and cone gears 45. An output shaft of the single-output actuator 41 is fixedly connected to the pinion 42. The swing gear 43 is sleeved on an outer side of the body 11. An external gear in transmission connection with the pinion 42 is provided at an outer side of the swing gear 43. Bevel gear 44 in transmission connection with a plurality of the cone gears 45 is provided on a top of the swing gear 43. The cone gears 45 each are in screwed driving connection with the compression part 46.

Figure 10:
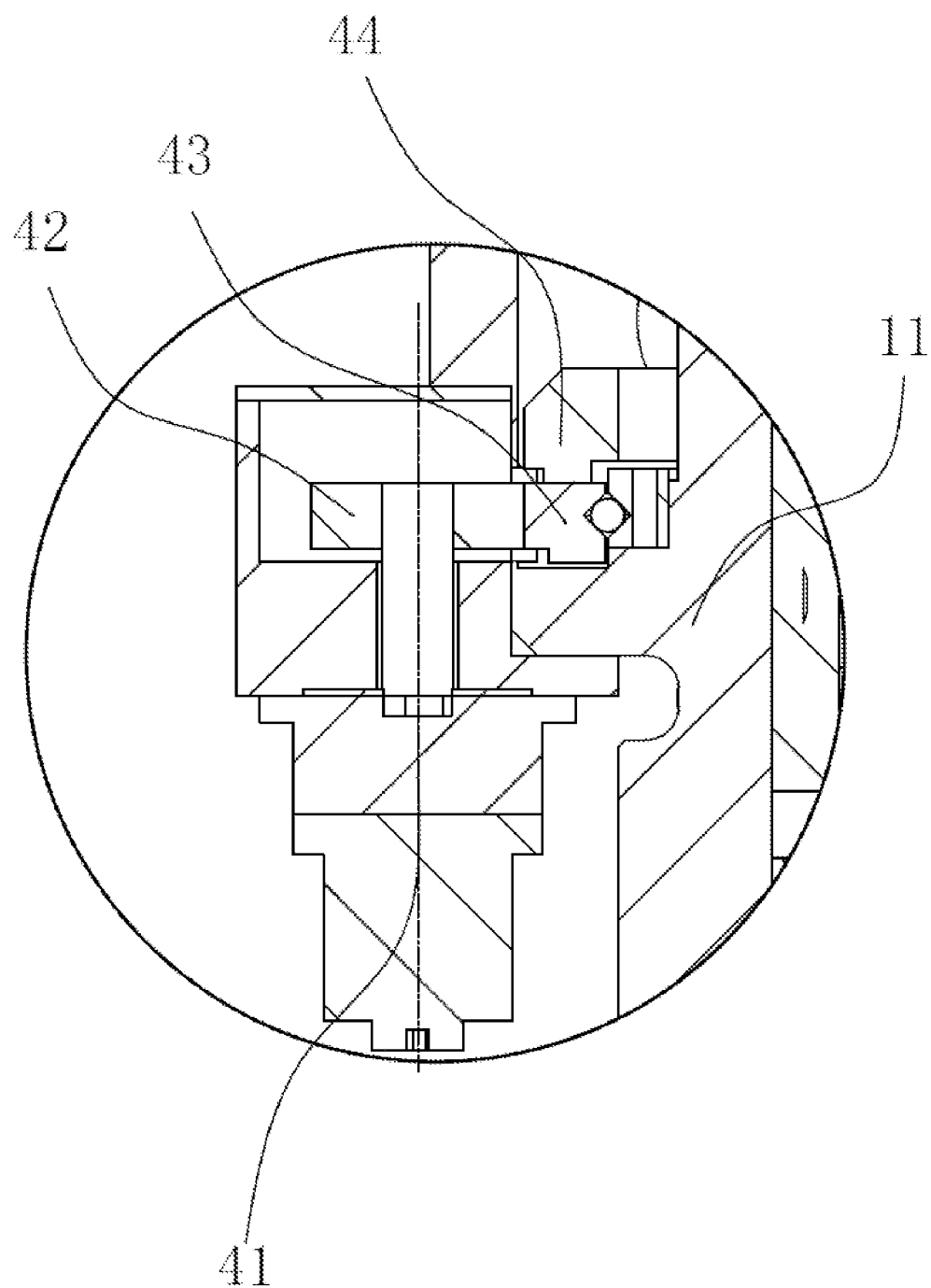
FIG. 10 is a partially schematic view of A shown in FIG. 9.

In the embodiment, a first bearing is fixedly provided on the body 11. The first bearing includes an inner race fixedly connected to the body 11, and an outer race being the swing gear 43. As shown in FIG. 10, the inner race of the bearing is fixedly provided on the body 11. The outer race of the bearing is the swing gear 43. In the embodiment, the swing gear 43 and the bevel gear 44 are two components. In installation, the bevel gear 44 is fixed fittingly above the swing gear 43, as shown in the figure. In a specific embodiment, the swing gear 43 and the bevel gear 44 may also be an integrated structure of a same component, and the bevel gear 44 is directly provided above the swing gear 43. In the embodiment, the swing gear 43 is a circle of gears on an outer surface of the outer race of the bearing. This realizes engaged transmission between the pinion 42 and the swing gear 43.

Figure 11:
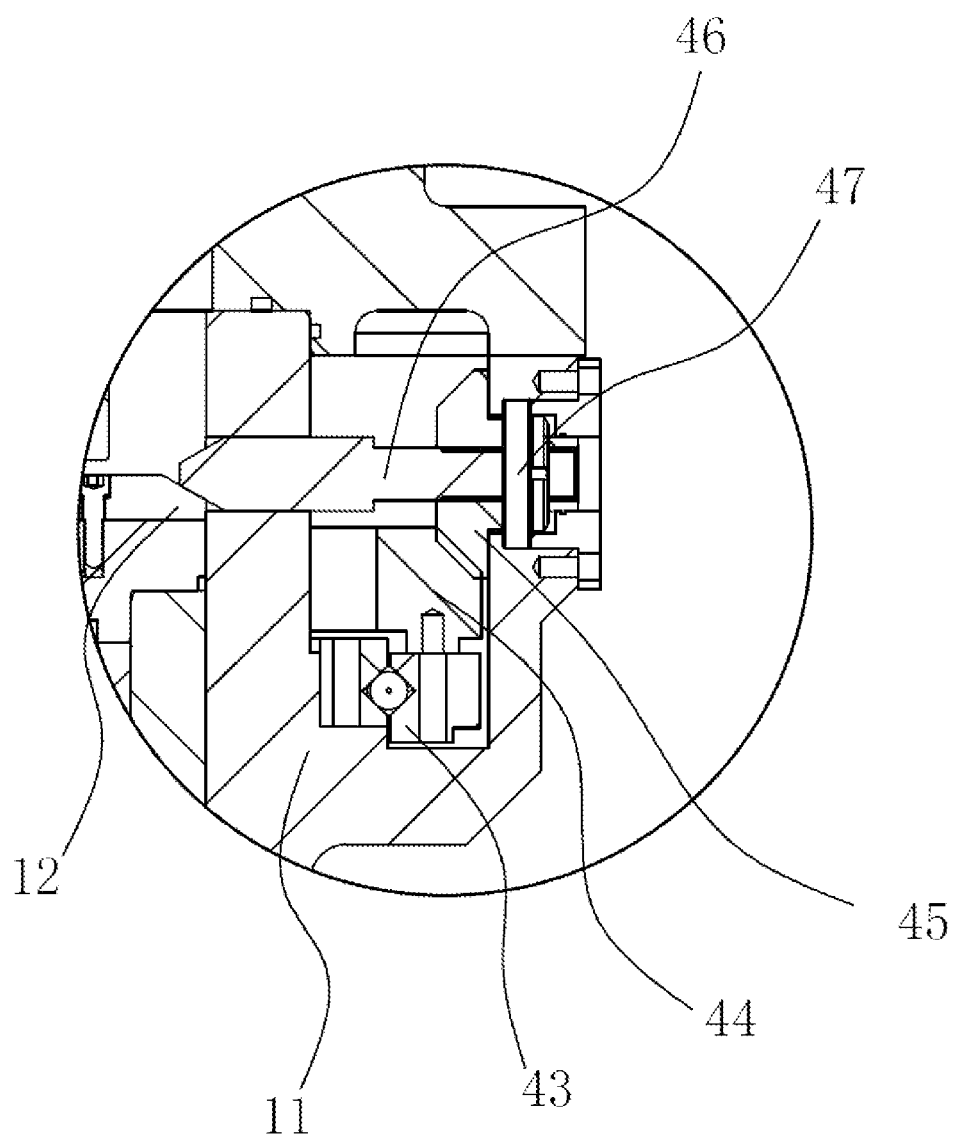
FIG. 11 is a partially schematic view of B shown in FIG. 9.

As shown in FIG. 11, one end of the compression part 46 is provided with an outer thread. The cone gear 45 is provided with an inner thread, and fixedly connected to the body 11 through second bearing 47. The outer thread and the inner thread are engaged and are in screwed driving connection. The other end (a left end shown in the figure) of the compression part 46 passes through the body 11 and is slidably connected to the body. The other end of the compression part 46 is a polygonal structure. A polygonal through hole for passing through the compression part 46 is also formed in the body 11 and corresponding to the compression part. In the figure, the compression part 46 compresses the rotating sealing assembly.

In the embodiment, there are four equally spaced compression parts 46, and four equally spaced second bearings 47 matching with the compression parts in FIG. 11. This equalizes a pressure of the compression part 46 on the rotating sealing assembly, and makes compression more reliable. In a specific embodiment, according to an actual well control condition, more compression parts 46 may be provided as required.

In the embodiment, the compression mechanism 4 works as follows: Before placement of the rotating sealing assembly 12, the compression part 46 is located in the body 11, and does not extend out of the inner surface of the bore through hole. The rotating sealing assembly 12 is placed into the body 11 from an upward side of the bore through hole. When the rotating sealing assembly gets to a preset position, the single-output actuator 41 drives the pinion 42 connected to the output end of the single-output actuator 41 to rotate. The pinion 42 is in transmission connection with the swing gear 43, and drives the bevel gear 44 to rotate. The bevel gear 44 drives four cone gears 45 to rotate. In response to rotation of the cone gears 45, the compression part 46 threadedly connected to each of the cone gears makes relative movement in a horizontal direction in the figure. Since the cone gear 45 is fixed on the body 11 through the second bearing 47, the cone gear 45 does not move in the horizontal direction in the figure, and the compression part 46 moves toward a center of the body 11. Therefore, the rotating sealing assembly 12 is pressed downward in the figure in an axial direction of the body 11. When the rotating sealing assembly 12 is to be taken out, the single-output actuator 41 controls the compression part 46 to retract into the body 11.

Figure 14:
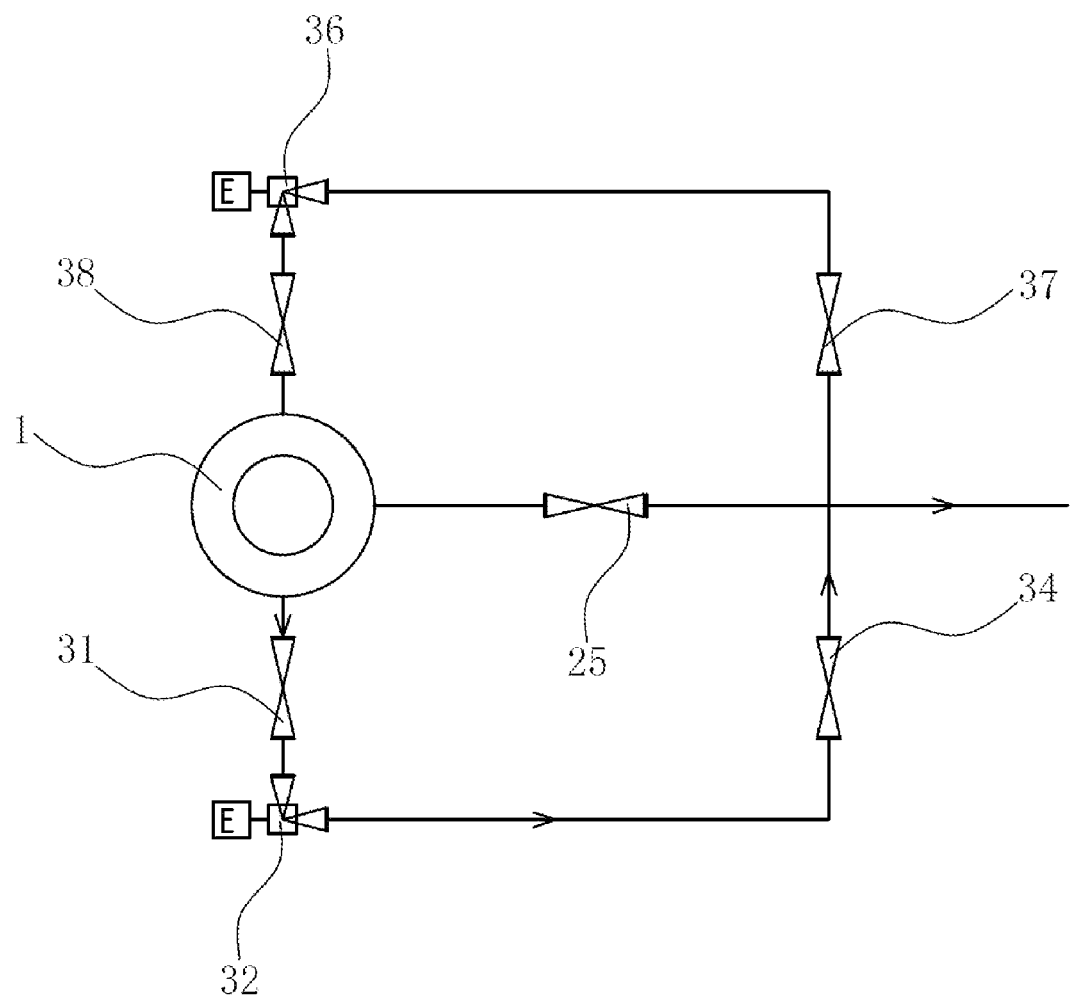
FIG. 14 illustrates a flowchart of a first working state according to Embodiment 1.

FIG. 14 illustrates a flowchart of a first working state in Embodiment 1, namely a flowchart of choke control of the multifunctional RCD. As shown in the figure, in response to the choke control, the straight-through cut-off valve 25 is turned off, and only the first side cut-off valve 31 and the second side cut-off valve 34 are turned on. A fluid in the flow channel flows to an arrow direction in the figure. By controlling the first side choke 32, choke control on the fluid is realized. That is, in the embodiment, one path of choke control channel performs the choke control on the fluid, while the other path of choke control channel is used as an alternative.

Figure 15:
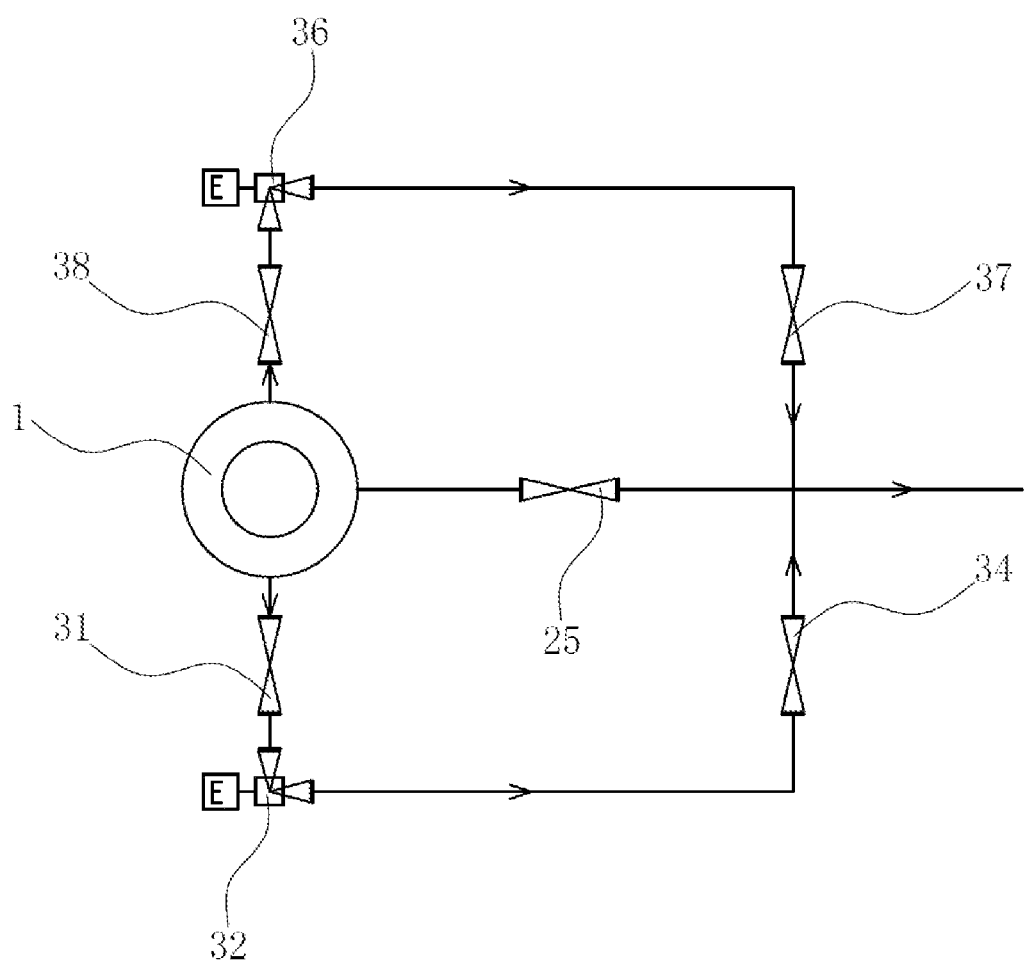
FIG. 15 illustrates a flowchart of a second working state according to Embodiment 1.

FIG. 15 illustrates a flowchart of a second working state in Embodiment 1, namely a flowchart of choke control of the multifunctional RCD. As shown in the figure, in response to the choke control, the straight-through cut-off valve 25 is turned off, and the first side cut-off valve 31, the second side cut-off valve 34, the third side cut-off valve 38, and the fourth side cut-off valve 37 are turned on. A fluid in the flow channel flows to an arrow direction in the figure. By controlling the first side choke 32 and the second side choke 36, the choke control on the fluid is realized.

Figure 16:
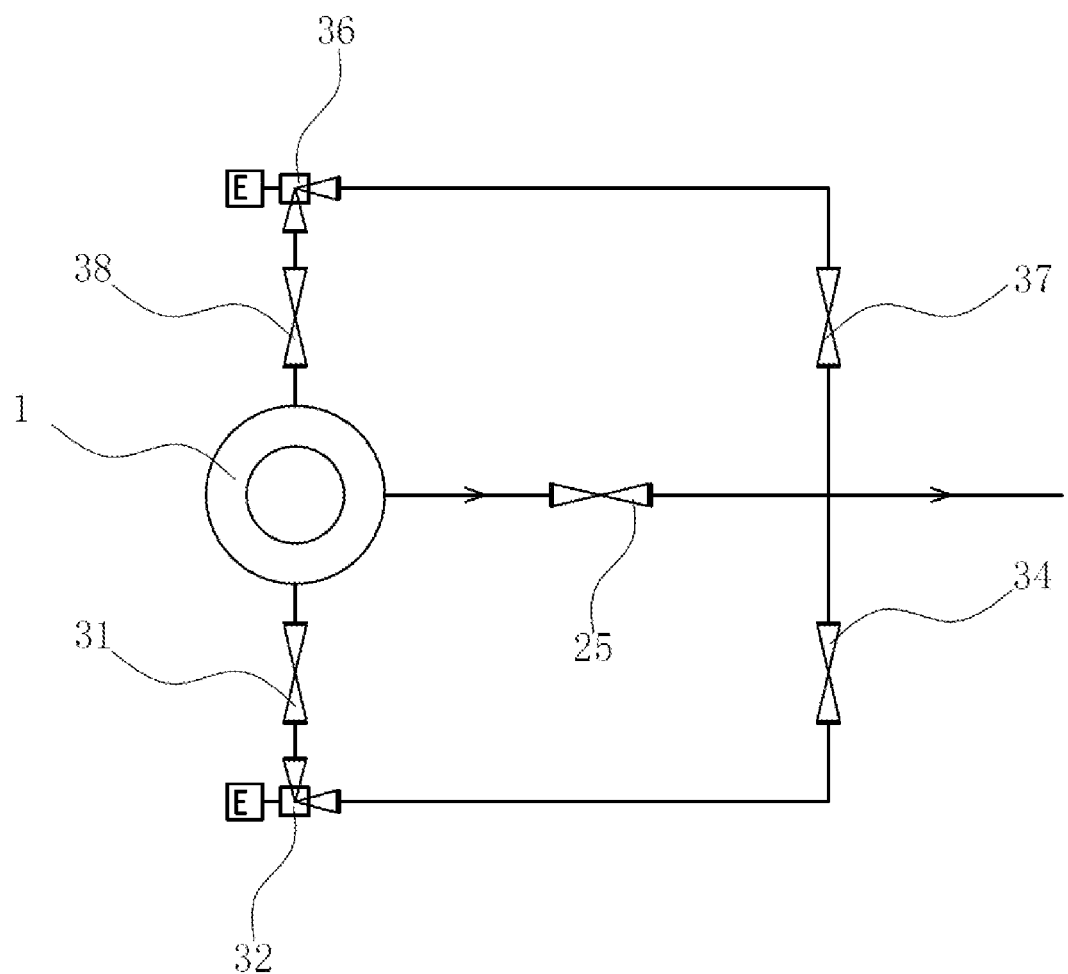
FIG. 16 illustrates a flowchart of a third working state according to Embodiment 1.

FIG. 16 illustrates a flowchart of a third working state in Embodiment 1, namely a straight-through state of the multifunctional RCD. As shown in the figure, the first side cut-off valve 31, the second side cut-off valve 34, the third side cut-off valve 38, and the fourth side cut-off valve 37 are turned off, and the straight-through cut-off valve 25 is turned on. A fluid in the flow channel flows to an arrow direction in the figure, and directly flows out from the straight-through cut-off valve 25.

Figure 12:
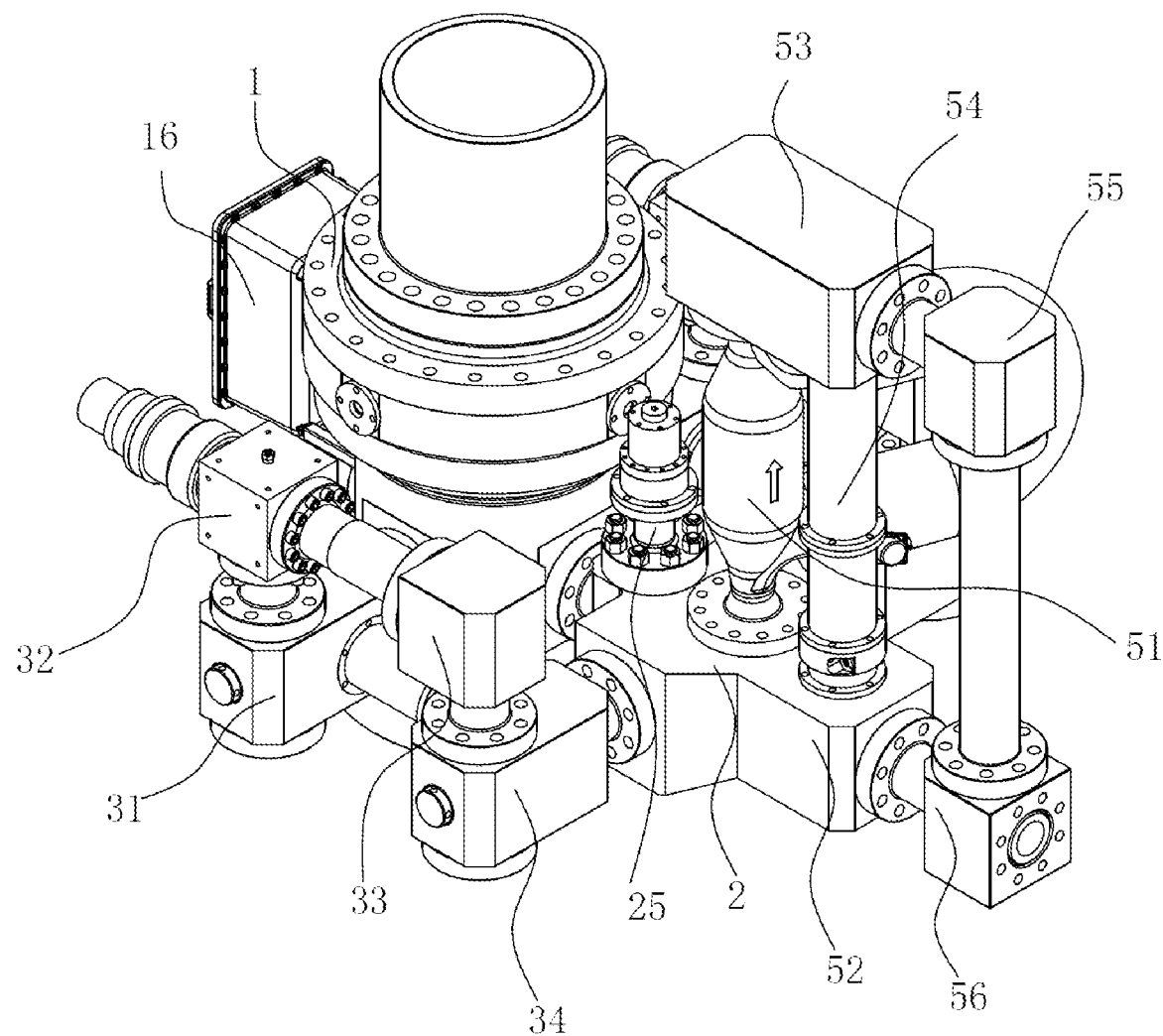
FIG. 12 is a stereoscopic structural schematic view of a multifunctional RCD according to Embodiment 2.
Figure 13:
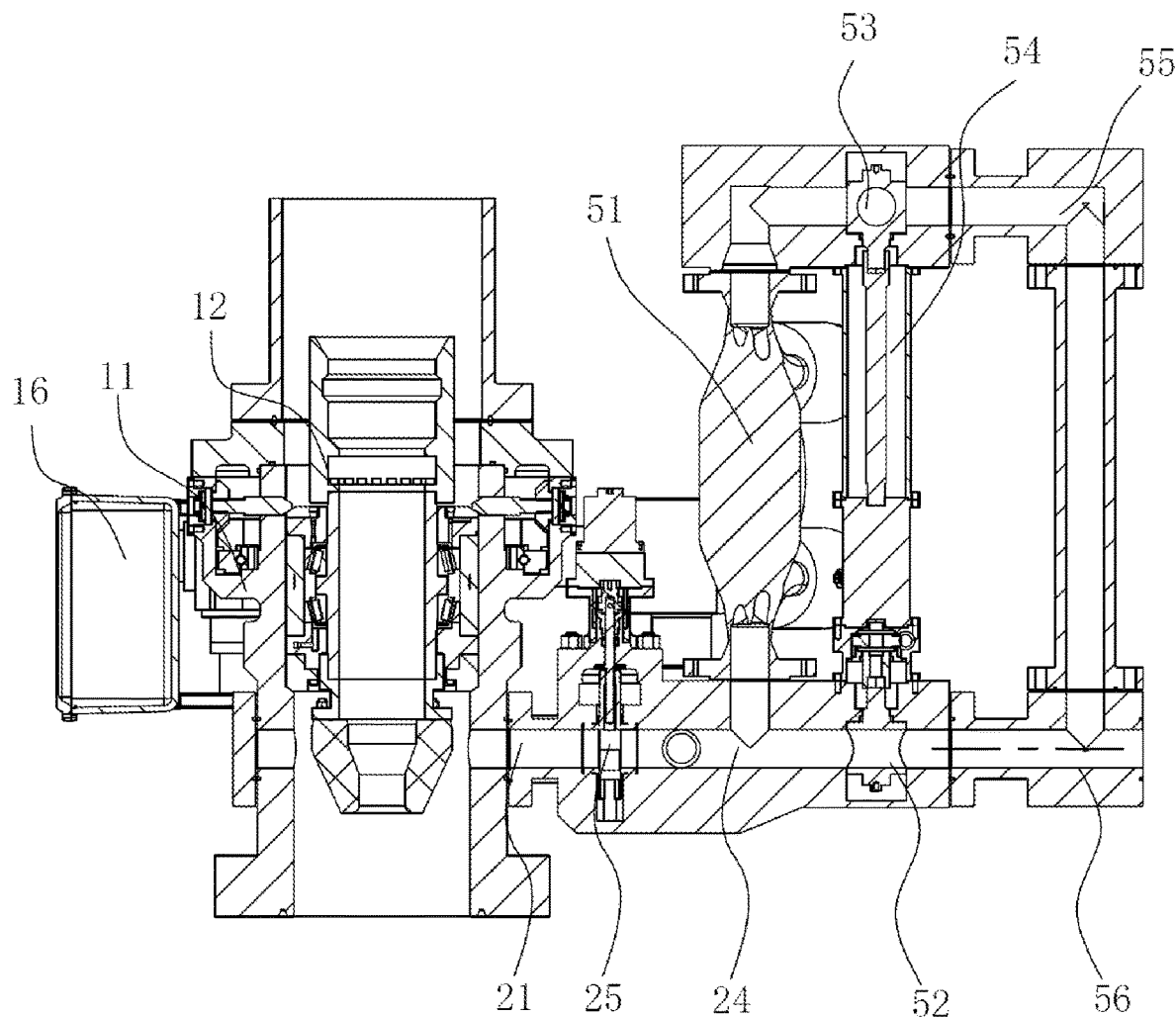
FIG. 13 is a sectional view in a first direction according to Embodiment 2.

FIG. 12 and FIG. 13 illustrate a structural schematic view according to Embodiment 2. Compared with Embodiment 1, a flow detection module is added. The flow detection module is provided at a fourth outlet 24 end of the multi-way cross 2, and communicated to the fourth outlet 24. Specifically, the flow detection module includes flowmeter 51, first flow cut-off valve 52, and second flow cut-off valve 53. The flowmeter 51 extends upward in the direction of the bore through hole. The first flow cut-off valve 52 and the second flow cut-off valve 53 are respectively provided at two ends of the flowmeter 51, and communicate with the flowmeter 51. An inlet of the flowmeter 51 is a flow detection input outlet. The flow detection input outlet is provided at the fourth outlet 24 end. That is, a fifth outlet connected to a flow detection inlet is provided adjacent to the fourth outlet 24 of the multi-way cross 2, and the fifth outlet and the multi-way cross 2 are an integrated structure. An outlet of the second flow cut-off valve 53 is a flow detection output outlet. As shown in the figure, the first flow cut-off valve 52 is also provided adjacent to the fourth outlet 24, namely integrated with the multi-way cross 2. The first flow cut-off valve 52 and the second flow cut-off valve 53 are opposite to each other in a direction shown in the figure. Flow double-output actuator 54 is provided between the first flow cut-off valve 52 and the second flow cut-off valve 53 and configured to drive one of the first flow cut-off valve 52 and the second flow cut-off valve 53 to turn on and the other of the first flow cut-off valve 52 and the second flow cut-off valve 53 to turn off. Second right-angle connector 55 is provided at the outlet of the second flow cut-off valve 53. The second right-angle connector 55 is connected to an outlet of the first flow cut-off valve 52 through three-way connector 56. Likewise, the control module is electrically connected to the flow detection module. That is, the control module controls on-off of each valve through the flow double-output actuator 54.

The flow double-output actuator 54 drives one of the first flow cut-off valve 52 and the second flow cut-off valve 53 to turn on and the other of the first flow cut-off valve and the second flow cut-off valve to turn off. That is, when flow detection is to be performed on a fluid, the flow double-output actuator 54 turns off the first flow cut-off valve 52, and turns on the second flow cut-off valve 53. Through the flowmeter 51, the fluid flows out from an output end of the second flow cut-off valve 53 and finally flows out through the three-way connector 56, thereby realizing the flow detection on the fluid.

When the flow detection is not required, the flow double-output actuator 54 turns on the first flow cut-off valve 52, and turns off the second flow cut-off valve 53. The fluid does not pass through the flowmeter 51, and directly flows out from the first flow cut-off valve 52, then flows out from an output end of the three-way connector 56.

Figure 17:
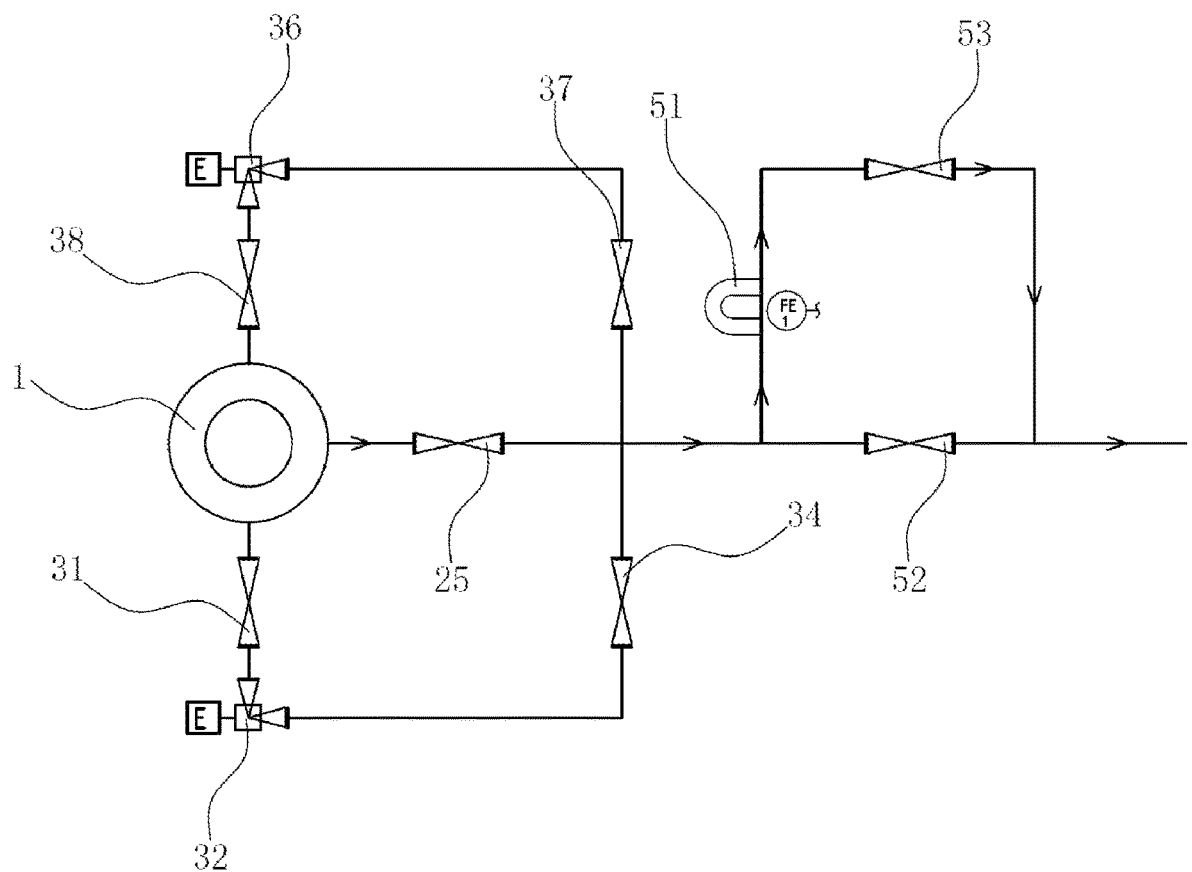
FIG. 17 illustrates a flowchart of a first working state according to Embodiment 2.

FIG. 17 illustrates a flowchart of a first working state according to Embodiment 2, namely a flowchart of flow detection of the multifunctional RCD. As shown in the figure, the choke control module is turned off, namely the first side cut-off valve 31, the second side cut-off valve 34, the third side cut-off valve 38, and the fourth side cut-off valve 37 are turned off. In response to the flow detection, the straight-through cut-off valve 25 is turned on, the first flow cut-off valve 52 is turned off, and the second flow cut-off valve 53 is turned on. Through the flowmeter 51, a fluid flows out from the output end of the second flow cut-off valve 53. The fluid in the flow channel flows to an arrow direction in the figure, thereby realizing the flow detection on the fluid.

Figure 18:
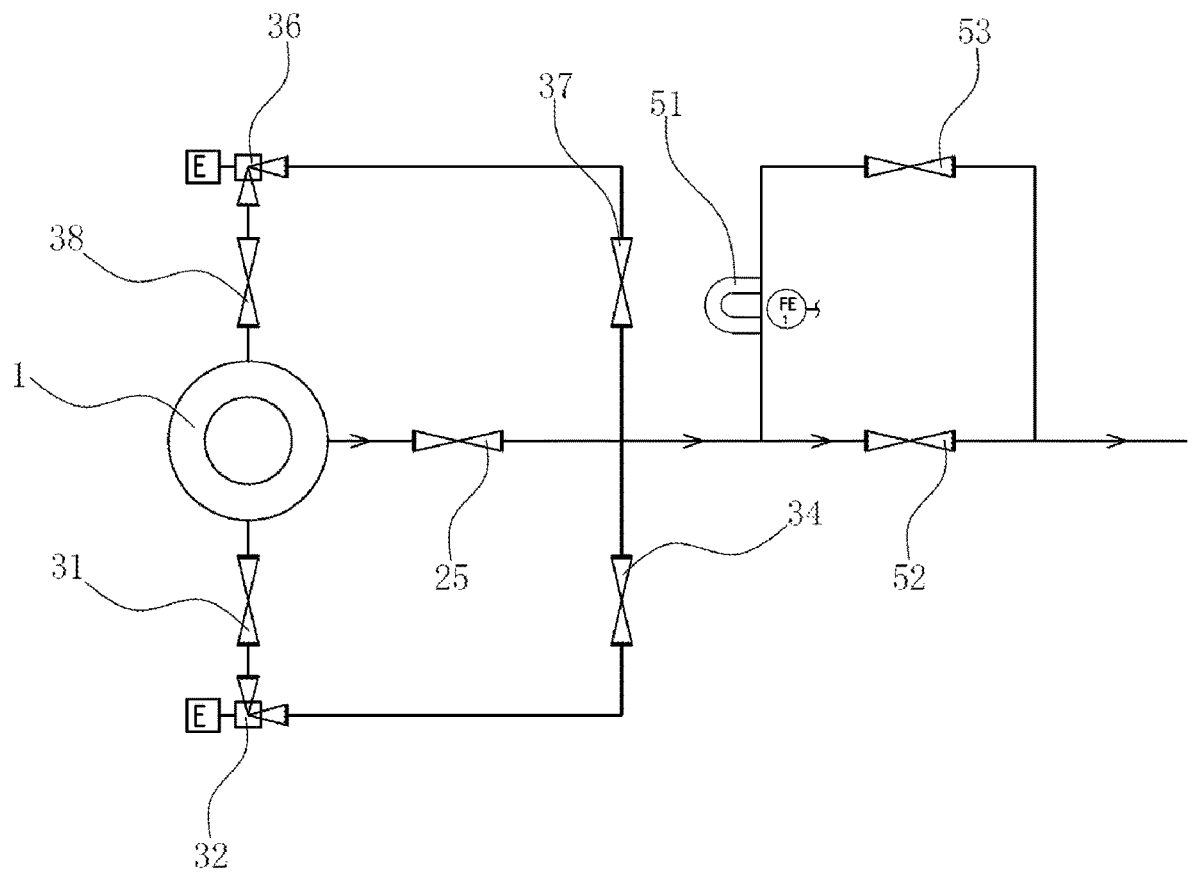
FIG. 18 illustrates a flowchart of a second working state according to Embodiment 2.

FIG. 18 illustrates a flowchart of a second working state according to Embodiment 2. The first flow cut-off valve 52 is turned on. Compared with FIG. 17, the second flow cut-off valve 53 is turned off. A fluid does not pass through the flowmeter 51. The fluid in the flow channel flows to an arrow direction in the figure, and directly flows out from the output end of the first flow cut-off valve 52.

Figure 19:
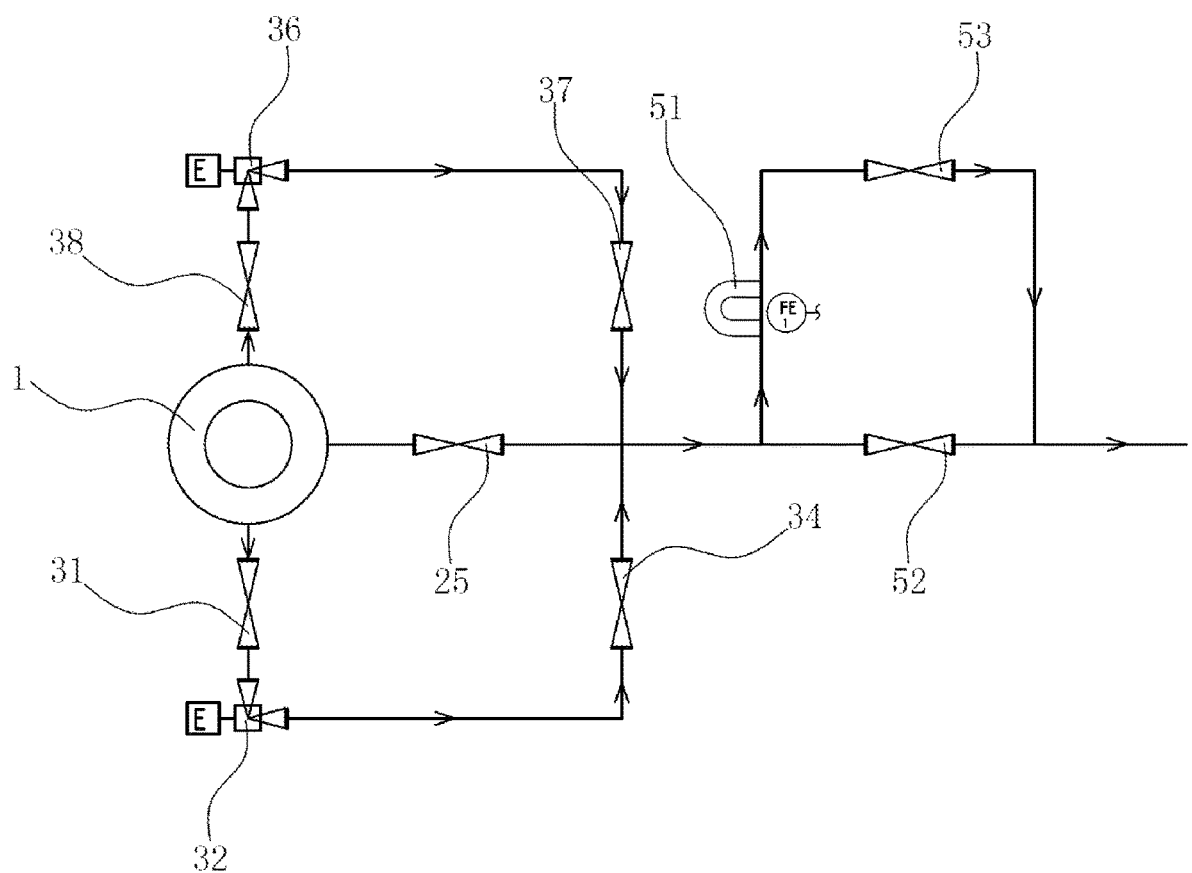
FIG. 19 illustrates a flowchart of a third working state according to Embodiment 2.

FIG. 19 illustrates a flowchart of a third working state in Embodiment 2, namely a flowchart of choke control and flow detection of the multifunctional RCD. As shown in the figure, the straight-through cut-off valve 25 is turned off, and the first side cut-off valve 31, the second side cut-off valve 34, the third side cut-off valve 38, and the fourth side cut-off valve 37 are turned on. A fluid in the flow channel flows to an arrow direction in the figure. By controlling the first side choke 32 and the second side choke 36, the choke control on the fluid is realized. Meanwhile, the first flow cut-off valve 52 is turned off, and the second flow cut-off valve 53 is turned on. Through the flowmeter 51, the fluid flows out from the output end of the second flow cut-off valve 53. The fluid in the flow channel flows to the arrow direction in the figure, thereby realizing the flow detection on the fluid.

In the above FIG. 17, FIG. 18 and FIG. 19, according to an actual use condition, the choke control module may also use one path for the choke control and one path as the alternative, and may also use the two paths for the choking.

In the embodiment, the double-output actuator has an electric driving structure. A manual driving mechanism may also be provided. In case of a failure or a fault of the electric driving structure, the manual driving mechanism can ensure normal work of the system.

In the embodiment, a through hole for passing through the compression part 46 is formed in the body 11. The compression part 46 may be non-circular according to an actual use condition to prevent rotation of the compression part 46.

In the embodiment of the present disclosure, the straight-through cut-off valve 25, the first flow cut-off valve 52, the inlet of the flowmeter 51 and the multi-way cross 2 are an integrated structure. That is, the above components are combined together, and this makes the structure more compact, and the size smaller. Meanwhile, in specific application, the above components may be a split structure according to an actual condition.

In this embodiment, all cut-off valves are the type of plug valve. In a specific embodiment, other types of cut-off valves such as gate valve, ball valve, etc., can be selected according to specific use conditions. The valve trim involved is the type of plug.

The above described are merely preferred embodiments of the present disclosure, which are not intended to limit the present disclosure. Any modifications, equivalent replacements and improvements made within the spirit and principle of the present disclosure should be included in the protection scope of the present disclosure.

What is claimed is:

1. A multifunctional rotating control device (RCD), comprising an RCD assembly, a multi-way cross, and choke control modules, wherein
    the RCD assembly comprises a body and a rotating sealing assembly; a bore through hole, two side outlets, and a straight-through outlet are formed in the body; the rotating sealing assembly is provided in the bore through hole; and a straight-through cut-off valve is provided at the straight-through outlet; and
    two choke control modules comprising a first choke control module, including a first side choke, and a second choke control module, wherein the two choke control modules are respectively connected to the two side outlets and the multi-way cross, and wherein the first side choke extends upward in a direction of the bore through hole,
    wherein the multi-way cross comprises a first outlet and a second outlet, and wherein the first choke control module comprises a first side cut-off valve and a second side cut-off valve; the first side outlet, the first side cut-off valve, the first side choke, the second side cut-off valve, and the second outlet are communicated in sequence.

2. The multifunctional RCD according to claim 1, wherein
    the multi-way cross comprises a third outlet; the first outlet communicates with the straight-through outlet; the straight-through cut-off valve is provided adjacent to the first outlet; and the two side outlets are respectively a first side outlet and a second side outlet.

3. The multifunctional RCD according to claim 2, wherein
    the second choke control module comprises a third side cut-off valve, a fourth side cut-off valve, and a second side choke; the second side outlet, the third side cut-off valve, the second side choke, the fourth side cut-off valve, and the third outlet are communicated in sequence; and the second side choke extends upward in the direction of the bore through hole.

4. The multifunctional RCD according to claim 3, wherein the third side cut-off valve, the fourth side cut-off valve, and the second side choke each are provided with a right-angle flow channel.

5. The multifunctional RCD according to claim 4, wherein the third side cut-off valve and the fourth side cut-off valve are opposite to each other; and a choke double-output actuator is provided between the third side cut-off valve and the fourth side cut-off valve and configured to drive the third side cut-off valve and the fourth side cut-off valve to turn on or off at the same time.

6. The multifunctional RCD according to claim 3, wherein a filter is provided in a flow channel at an outlet end of the third side cut-off valve.

7. The multifunctional RCD according to claim 2, wherein the first side cut-off valve, the second side cut-off valve, and the first side choke each are provided with a right-angle flow channel.

8. The multifunctional RCD according to claim 7, wherein the first side cut-off valve and the second side cut-off valve are opposite to each other; and a choke double-output actuator is provided between the first side cut-off valve and the second side cut-off valve and configured to drive the first side cut-off valve and the second side cut-off valve to turn on or off at the same time.

9. The multifunctional RCD according to claim 2, wherein a filter is provided in a flow channel at an outlet end of the first side cut-off valve.

10. The multifunctional RCD according to claim 2, wherein the multifunctional RCD further comprises a flow detection module; the multi-way cross further comprises a fourth outlet; and the flow detection module is provided at the fourth outlet end and communicated with the multi-way cross.

11. The multifunctional RCD according to claim 10, wherein the flow detection module comprises a flowmeter, a first flow cut-off valve, and a second flow cut-off valve; the flowmeter extends upward in the direction of the bore through hole; the first flow cut-off valve and the second flow cut-off valve are respectively provided at two ends of the flowmeter, and communicate with the flowmeter; an inlet of the flowmeter is a flow detection input outlet; the flow detection input outlet is provided at the fourth outlet end; and an outlet of the second flow cut-off valve is a flow detection output outlet.

12. The multifunctional RCD according to claim 11, wherein the first flow cut-off valve and the second flow cut-off valve are opposite to each other; and a flow double-output actuator is provided between the first flow cut-off valve and the second flow cut-off valve and configured to drive a first one of the first flow cut-off valve and the second flow cut-off valve to turn on and a second one of the first flow cut-off valve and the second flow cut-off valve to turn off.

13. The multifunctional RCD according to claim 1, wherein the multifunctional RCD further comprises a compression mechanism for compressing the rotating sealing assembly; and the compression mechanism is provided on the body.

14. The multifunctional RCD according to claim 13, wherein the compression mechanism comprises a compression part and a driving mechanism; and the driving mechanism drives the compression part to extend out of an inner surface of the body or retract into the body.

15. The multifunctional RCD according to claim 14, wherein the driving mechanism comprises a single-output actuator and a transmission mechanism; the transmission mechanism comprises a pinion, a swing gear, and cone gears; an output shaft of the single-output actuator is fixedly connected to the pinion; the swing gear is sleeved on an outer side of the body; an external gear is in transmission connection with the pinion and is provided at an outer side of the swing gear; a bevel gear is in transmission connection with a plurality of the cone gears and is provided on a top of the swing gear; and the cone gears each are in screwed driving connection with the compression part.

16. The multifunctional RCD according to claim 15, wherein a first bearing is fixedly provided on the body; and the first bearing comprises an inner race fixedly connected to the body, and an outer race being the swing gear.

17. The multifunctional RCD according to claim 16, wherein a first end of the compression part is provided with an outer thread; the cone gear is provided with an inner thread, and fixedly connected to the body through a second bearing; and the outer thread and the inner thread are engaged and are in screwed driving connection.

18. The multifunctional RCD according to claim 17, wherein a second end of the compression part passes through the body and is slidably connected to the body.

19. The multifunctional RCD according to claim 18, wherein a non-circular hole is formed in the body; and the compression part is provided with a structure matching with the non-circular hole, and the compression part is slidably connected to the structure matching with the non-circular hole.

20. The multifunctional RCD according to claim 15, wherein there are a plurality of compression parts, the plurality of compression parts are equally spaced in a circumferential direction of the body.

* * * * *